US006828766B2

(12) United States Patent
Corva et al.

(10) Patent No.: US 6,828,766 B2
(45) Date of Patent: Dec. 7, 2004

(54) VOLTAGE REGULATOR

(75) Inventors: Giulio Corva, Vittuone (IT); Adalberto Mariani, Garlasco (IT)

(73) Assignee: STMicroelectronics S.r.l., Agrate Brianza (IT)

(*) Notice: Subject to any disclaimer, the term of this patent is extended or adjusted under 35 U.S.C. 154(b) by 0 days.

(21) Appl. No.: 10/449,759

(22) Filed: May 30, 2003

(65) Prior Publication Data

US 2003/0231012 A1 Dec. 18, 2003

(30) Foreign Application Priority Data

May 30, 2002 (IT) .......................................... VA02A0038

(51) Int. Cl.[7] .............................................. G05F 1/40
(52) U.S. Cl. ........................ 323/284; 323/225; 323/315; 323/285
(58) Field of Search ................................ 323/222, 223, 323/224, 225, 232, 282, 283, 284, 285, 288, 290, 315, 316

(56) References Cited

U.S. PATENT DOCUMENTS

| 5,491,445 | A | * | 2/1996 | Moller et al. ................ 323/222 |
| 5,770,940 | A | * | 6/1998 | Goder ......................... 323/282 |
| 6,127,815 | A | * | 10/2000 | Wilcox ........................ 323/282 |
| 6,724,174 | B1 | * | 4/2004 | Esteves et al. .............. 323/224 |

* cited by examiner

*Primary Examiner*—Jessica Han
(74) *Attorney, Agent, or Firm*—Lisa K. Jorgenson; Allen, Dyer, Doppelt, Milbrath & Gilchrist, P.A.

(57) ABSTRACT

A circuit device generates a signal proportional to the current circulating in an inductor and a current comparator, which is disabled by a stand-by signal, and is input with a feedback signal and with a signal proportional to the current circulating in the inductor and generates a logic comparison signal. A control logic, input with a logic comparison signal and the stand-by signal, drives the switch or the switches of a power stage. A clamp, connected in parallel to a capacitive branch, makes the feedback signal greater than a certain minimum threshold, to make the current that is delivered to the load, when the regulator is not in the stand-by state, greater than a certain minimum current.

28 Claims, 8 Drawing Sheets

VOLTAGE REGULATOR

FIELD OF THE INVENTION

The present invention relates to voltage regulators, and more particularly to a voltage regulator capable of quickly restoring the normal functioning mode after an abrupt load variation during a stand-by state.

BACKGROUND OF THE INVENTION

Switching regulators include one or more power switches, components capable of storing energy (inductor and capacitor) and a control circuit, generally including both analog and digital circuits, for driving the power switch(es) to nullify or reduce the error between the output voltage of the regulator and a reference voltage. In certain applications (e.g. in battery powered devices) a high efficiency of the regulator even under low load conditions is important. At low loads the power consumption of the regulator is substantially due to the control circuit, both by the digital and analog stages, because power dissipation in the power switch(es) is negligible. The current absorbed by the logic driving circuit, for loading the capacitance(s) of the control input of the switch(es), is proportional to the switching frequency, while the consumption of the analog portion of the control circuit is substantially independent from the frequency.

To improve the efficiency under low load conditions, it would be necessary to reduce the switching frequency and the power dissipation of the analog stages. Constraints on the size of inductors and capacitors impose the choice of a relatively high switching frequency and the dissipation of the analog blocks cannot be reduced beyond a certain limit, otherwise performance would be excessively penalized. Many architectures of controllers implementing a specific low load functioning mode, different from that used at high load conditions, have been proposed, for modifying the operating parameters. The known approaches that are discussed hereinbelow refer to a current-mode regulator such as that depicted in FIG. 1. The converter may be, for instance, a buck converter, comprising a HS switch and eventually a second LS switch, working as a synchronous rectifier, with a dedicated comparator ZERO_CROSSING COMP for detecting and signaling the zero crossing of the current in the inductor of the control circuit, to make the latter prevent the current in the coil from inverting its direction.

Figure 1:
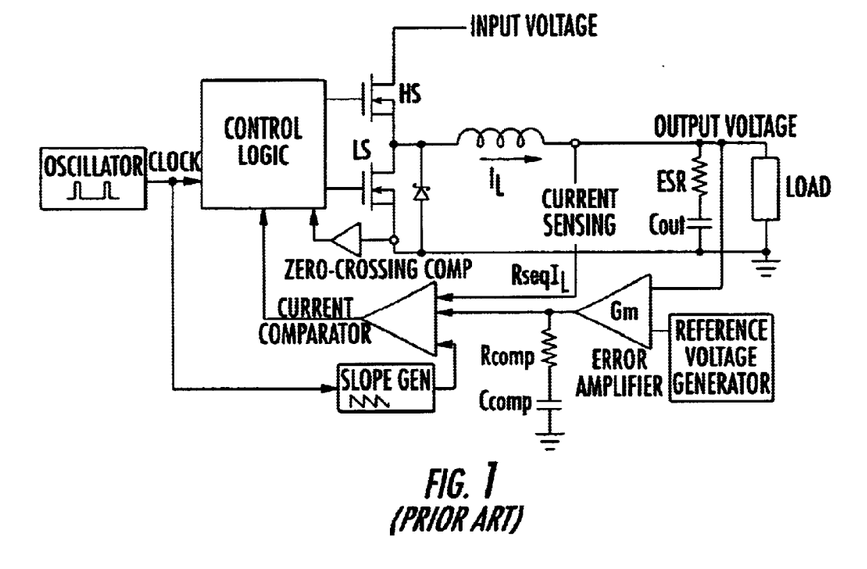
FIG. 1 is a schematic diagram depicting a known current mode voltage regulator.

The current mode controller comprises a first feedback loop that makes the current in the inductor equal to a certain programmed value. A second feedback loop (voltage loop) determines the programmed current in function of the integral of the error voltage, to which an eventual proportional contribution is added. Typically, the voltage loop is composed of an error amplifier $G_M$ (commonly a transconductance amplifier) and an integration capacitance $C_{COMP}$, defining an integrator, optionally with a compensation resistance $R_{COMP}$ in series thereto when a proportional contribution is required. Usually, the transconductance amplifier is capable of outputting a relatively low maximum current (in terms of absolute value) and proportional to the absorbed current, which on its turn does not depend on the voltage error (because the amplifier is a class A amplifier).

The current loop includes current sensing means/unit, represented by a circular dial on a terminal of the inductor, and by a comparator CURRENT COMPARATOR that compares a voltage proportional to the current in the inductor (for example, the voltage drop on a sensing resistor connected in series with the inductor or alternatively on the HS switch when it is on), with the output voltage of the transconductance amplifier that may be attenuated if needed. A clock signal, generated by an oscillator OSCILLATOR, switches on the switch HS while the comparator switches it off when the current flowing in the coil reaches the programmed value. A further ramp signal generated by the circuit SLOPE GEN is input to the comparator for ensuring the stability of the current loop when the duty-cycle is greater than 0.5.

The voltage loop is stable when the overall transfer function $G_{LOOP}(s)$ between the current in the inductor and the programmed current has a certain shape (appropriate cross frequency and phase margin) independently from the capacitance and the parasitic series resistance ESR of the output capacitor $C_{OUT}$. This implies an appropriate choice of the capacitance $C_{COMP}$ and of the compensation resistance $R_{COMP}$. In general, a compensation resistance is required when the zero frequency of the output capacitance $$f_{OUT} = \frac{1}{2\pi \cdot C_{OUT} \cdot ESR} \tag{1}$$

is very high.

A known technique for improving efficiency at low load includes making the regulator function in burst mode when the load current drops below a certain burst threshold. Each burst may be constituted by a plurality of pulses of the same frequency at which the regulator would be functioning with a load greater than the threshold, or, even, by a single pulse. In case there are more pulses, their number may be fixed or variable with the load.

In the interval between a burst and the successive one, the current in the inductor becomes null. The (average) current in the inductor during a burst must be at least equal to the current delivered to the load. Between a burst and the successive one, some of the analog circuits may be turned off, so that the effective average consumption of the controller diminishes when the load decreases. At null load conditions, only the analog blocks that cannot be turned off absorb a current, such as the reference voltage generator, and the components necessary to restore the switching activity.

When the burst is constituted by a single pulse, that is the current in the coil has a triangular waveform, the current peak must be at least twice the burst threshold $I_{BURST}$. When there are more pulses in a burst, the greater the number of pulses, the smaller each current peak may be than twice the burst threshold $I_{BURST}$. If each current peak is made equal to the burst threshold $I_{BURST}$, the system must be capable of varying the number of pulses of the burst in function of the load. At low load conditions there will be few pulses, while when the load increases and approaches the threshold there will be longer lasting bursts. This second mode is less noisy than the approach contemplating a single pulse because of the smaller peak current and for this reason it is often preferred.

Figure 2:
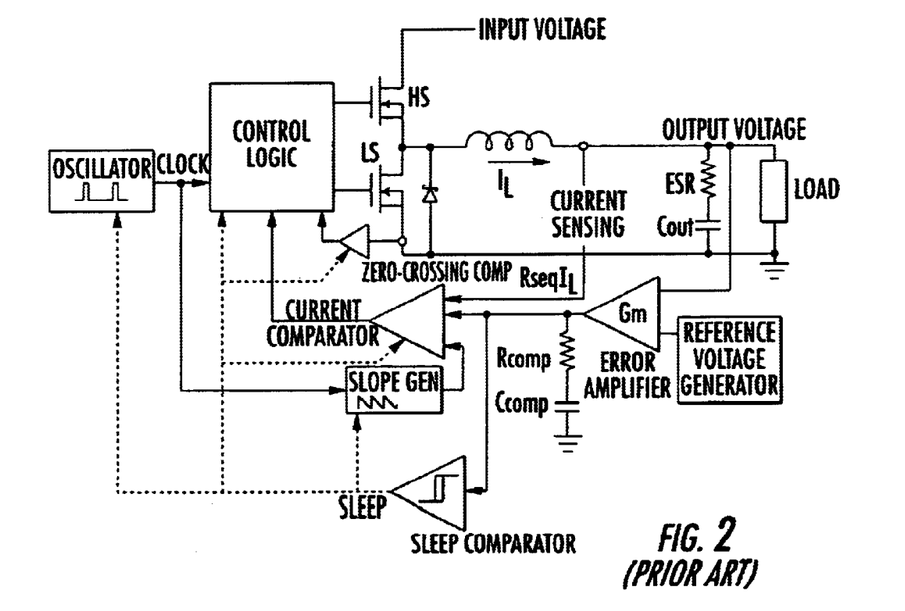
FIG. 2 is a schematic diagram depicting a known voltage regulator provided with a sleep comparator.

A way for implementing a variable duration burst mode under low load conditions is depicted in FIG. 2. A hysteresis comparator SLEEP COMPARATOR compares the output of the integrator that is proportional to the programmed current, with a threshold corresponding to the load current below which the burst mode functioning starts. The stand-by signal SLEEP generated by the comparator SLEEP COMPARATOR sets (when active) the regulator in stand-by, whereby the power switch HS and various analog circuits are turned off, among which the oscillator, the current comparator and the slope compensation circuit SLOPE GEN. If a second switch LS is present, this is turned on and remains on as long as the current in the inductor is positive, and it is turned off when the current becomes null. The integrating circuit and the reference voltage generator must remain on, instead.

Figure 3:
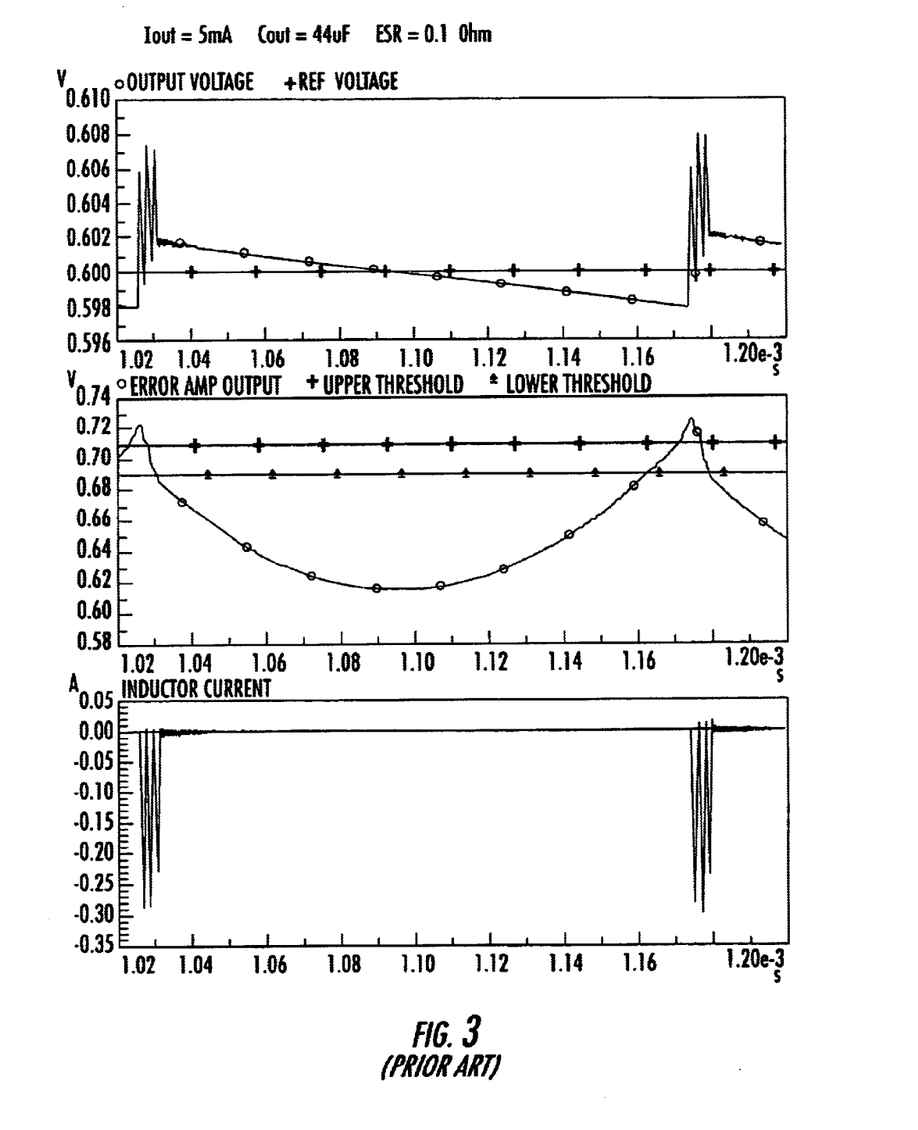
FIG. 3 is a diagram of the main signals of the regulator of FIG. 2.

As shown in FIG. 3, during each burst, the current in the coil is close to the burst current and the peak of each pulse varies in the range comprised between the upper $I_{MAX}$ and lower threshold $I_{MIN}$ of the comparator. Between a burst and the successive one, the current becomes null. The voltage of the integrator oscillates about the two thresholds of the sleep comparator and the output voltage oscillates about the reference voltage. The amplitude of the positive and negative over-elongations of the output voltage depends on the separation between the two thresholds, on the output capacitance and on its time constant $ESR*C_{OUT}$ and on the capacitive branch $R_{COMP}$-$C_{COMP}$ of the integrator.

The drawback of this known approach is the delay of response to a load transient. When the stand-by interval is long (very small load), the output of the integrator decreases below the lower threshold of the sleep comparator, to the negative saturation point of the integrator. If a load transient takes place during the stand-by, it is necessary to wait for the output of the integrator to reach the upper threshold before the switching be resumed. This lag time may be even longer because of the transconductance amplifier inability to deliver a large output current because of design restrictions for limiting power consumption. As a consequence, there may be the risk of a large under-elongation of the output voltage.

Another known type of regulator, depicted in FIG. 4, contemplates the use of a clamp on the output of the transconductance amplifier $G_M$ for preventing the output voltage of the integrator, and as a consequence the programmed current, to drop below the burst current $I_{BURST}$. If the load current is smaller than the burst current, the clamp turns on. The current in the inductor thus remains equal to the burst current, so the output voltage tends to increase. A comparator forces the stand-by state when the output exceeds by a certain quantity the reference voltage. The stand-by state is abandoned when a second comparator, or the comparator SLEEP COMPARATOR that forced the stand-by state itself, if it is a comparator with hysteresis, detects if the output voltage has become lower than the reference. During the stand-by state, it is possible to turn off also the transconductance amplifier $G_M$.

Figure 5:
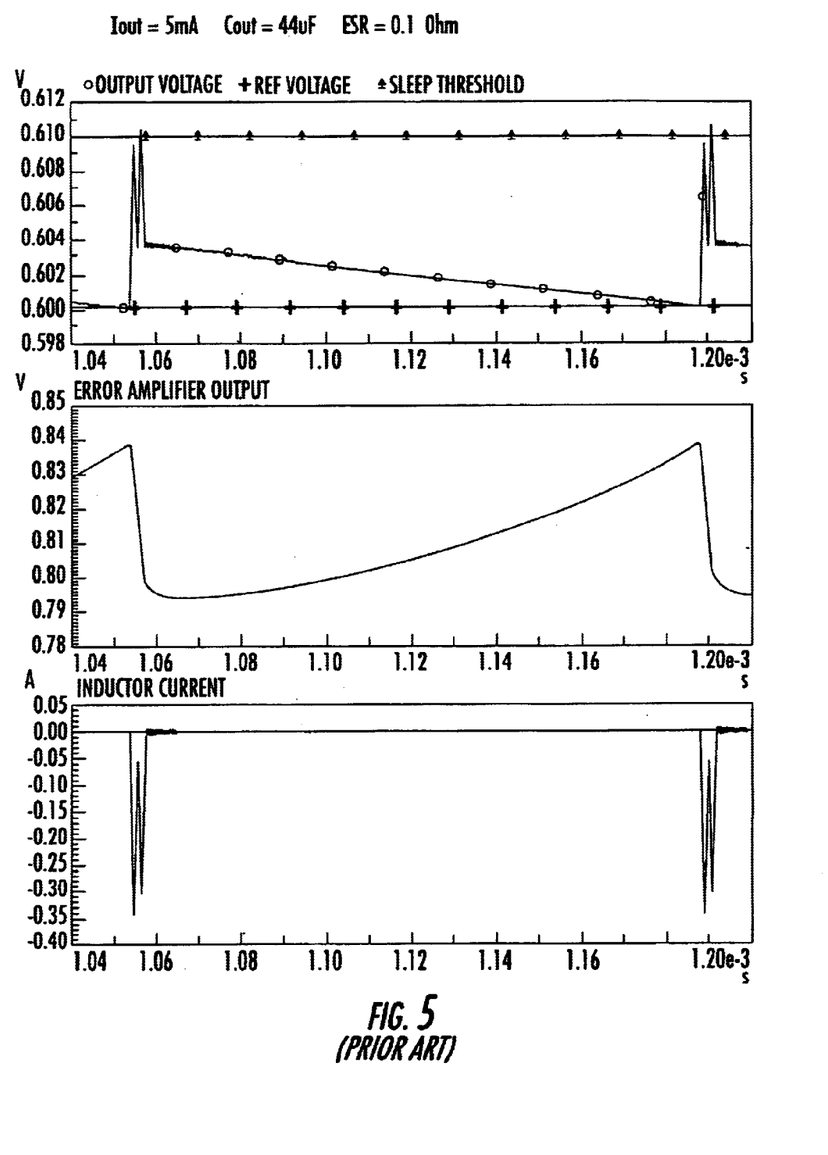
FIG. 5 is a diagram of the main signals of the regulator of FIG. 4.

According to this approach, the entering in and the exiting from stand-by (that is the duration of the burst and of the stand-by) are tied to the crossing of appropriately set thresholds by the output voltage, as depicted in FIG. 5, by contrast, according to the previous approach, the thresholds are placed on the programmed current (that is on the integral-proportional error). As a consequence, resumption of the switching caused by load transients occurring during a stand-by is almost instantaneous. However a drawback of this approach is that the duration of the burst may be hardly controlled as a function of the distance of the thresholds (amplitude of the hysteresis) of the sleep comparator SLEEP COMPARATOR when the parasitic resistance ESR of the output capacitor $C_{OUT}$ is relatively high.

The duration of the burst $T_{BURST}$ is approximately given by $$T_{BURST} = C_{OUT} \cdot \frac{\Delta V_{OUT} - ESR \cdot I_{BURST}}{I_{BURST} - I_{OUT}} \quad (2)$$

wherein $I_{OUT}$ is the load current and the variation of the output voltage $\Delta V_{OUT}$ is supposed to be greater than $ESR*I_{BURST}$. By contrast, in the regulator of FIG. 2 the dependence on the resistance ESR is far less marked. This is due to the fact that, given that the regulator is properly compensated, the transfer function $G_{LOOP}(s)$ between the current in the inductor and the programmed current does not depend on the value of the resistance ESR.

A further drawback is represented by the high accuracy that the integrator and the comparator for determining the output voltage must have. To make the system work correctly, the separation between the thresholds must be greater than the difference between the offsets of the integrator and of the comparator. To not excessively separate the two thresholds, which would cause an excessive output ripple, it is necessary to determine with high precision both the offset of the comparator and the offset of the integrator. Even in this respect the previous approach is preferable because the offset of the comparator determines in that case only the accuracy of the burst threshold.

Figure 6:
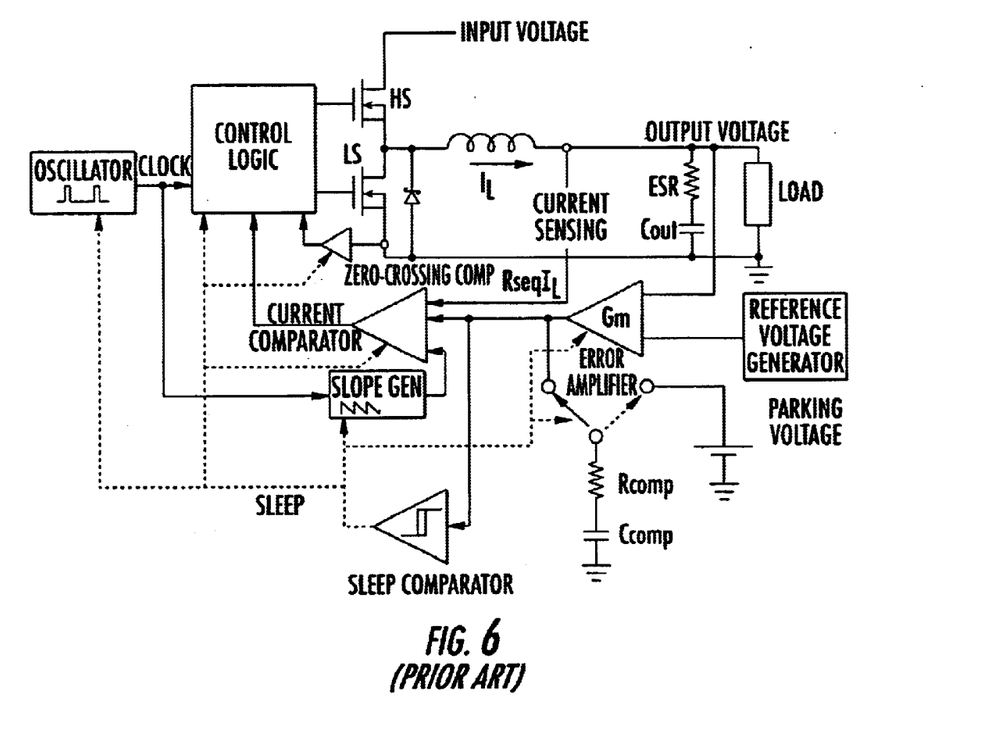
FIG. 6 is a schematic diagram depicting a third known voltage regulator with a sleep comparator and having an auxiliary voltage generator.

A third known regulator, shown in FIG. 6, responds more promptly (than the regulator of FIG. 2) to load variations during the stand-by state because it disconnects the integration capacitance (and its parasitic series resistance) from the output of the transconductance amplifier during the stand-by state and charges it with a voltage PARKING VOLTAGE greater than the stand-by threshold voltage. In this way, during the stand-by state, the transconductance amplifier $G_M$ is loaded only by its parasitic output capacitance toward ground and behaves practically as a comparator of the output voltage with the reference voltage. The stand-by state finishes practically when the output voltage becomes smaller than the reference voltage.

SUMMARY OF THE INVENTION

An object of this invention is to provide a burst controlled voltage regulator wherein the duration of each single burst does not depend sensibly on the time constant and on the capacitance of the output capacitor and that ensures a fast response to load variations.

Figure 4:
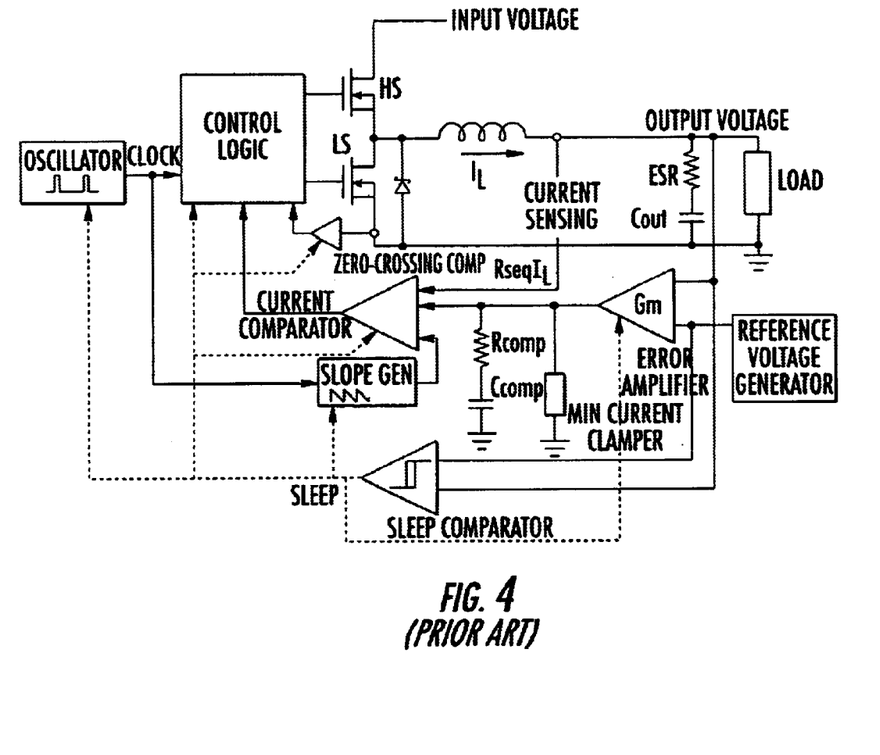
FIG. 4 is a schematic diagram depicting a second known voltage regulator with a sleep comparator including a clamp.

The invention stems from the recognition that a reason for the poor precision with which the duration of the burst is determined in a known regulator of the type depicted in FIG. 4, is that the sleep comparator is connected to the output node. Because of this, the burst period depends on the parasitic series resistance ESR of the output capacitor. It has been found that, if a minimum current clamp is connected in parallel to the capacitive branch, the current circulating in the clamp is a function of the difference between the output voltage and the reference voltage. Therefore, it is not necessary to connect the sleep comparator to the output node, but it is possible to input to it a signal representative of the current circulating in the clamp to resume from a stand-by state when the voltage decreases below a certain value, or to enter a stand-by state when the output voltage exceeds a certain value.

More precisely, the present invention is directed to a regulator of the supply voltage of a load comprising an inductor driven by a power stage, connected between a node at a non regulated supply voltage and a ground node, including at least a power switch for connecting the inductor to the node at a non regulated supply voltage, an output capacitor having a certain parasitic series resistance connected between the output node of the regulator and ground, an integrator of the error voltage, a clamp connected to the output of said integrator, a comparator with hysteresis of the current circulating in said clamp producing a stand-by signal when the current exceeds a certain threshold. The integrator, the consumption of which may be reduced by the stand-by signal, has a capacitive integration branch and generates a feedback signal proportional to the integral of the difference between the reference voltage and the output voltage. Dedicated circuit means generate a signal proportional to the current circulating in the inductor and a current comparator, which is disabled by the stand-by signal, is input with the feedback signal and with the signal proportional to the current circulating in the inductor and generates a logic comparison signal. A control logic, input with the logic comparison signal and the stand-by signal, drives the switch or the switches of the power stage. A clamp, connected in parallel to the capacitive branch, makes the feedback signal greater than a certain minimum threshold, to make the current that is delivered to the load, when the regulator is not in the stand-by state, greater than a certain minimum current.

The regulator of this invention is not affected by the above discussed drawbacks of the known regulators because it comprises circuit means for detecting the current circulating in the clamp and generating a signal representative of the sensed current, and the comparator with hysteresis has an input coupled to the signal representative of the current circulating in the clamp for activating the stand-by signal when the current circulating in the clamp exceeds an upper threshold and disabling it when this current diminishes below a lower threshold.

Optionally, the integrator comprises a transconductance amplifier input with the difference between the regulated supply voltage and the reference voltage, and a capacitive integrating branch connected between the output of the transconductance amplifier and the ground node of the regulator.

BRIEF DESCRIPTION OF THE DRAWINGS

The different aspects and advantages of this invention will become even more evident through a detailed description of few embodiments and by referring to the attached drawings, wherein.

DETAILED DESCRIPTION OF THE PREFERRED EMBODIMENTS

Figure 7:
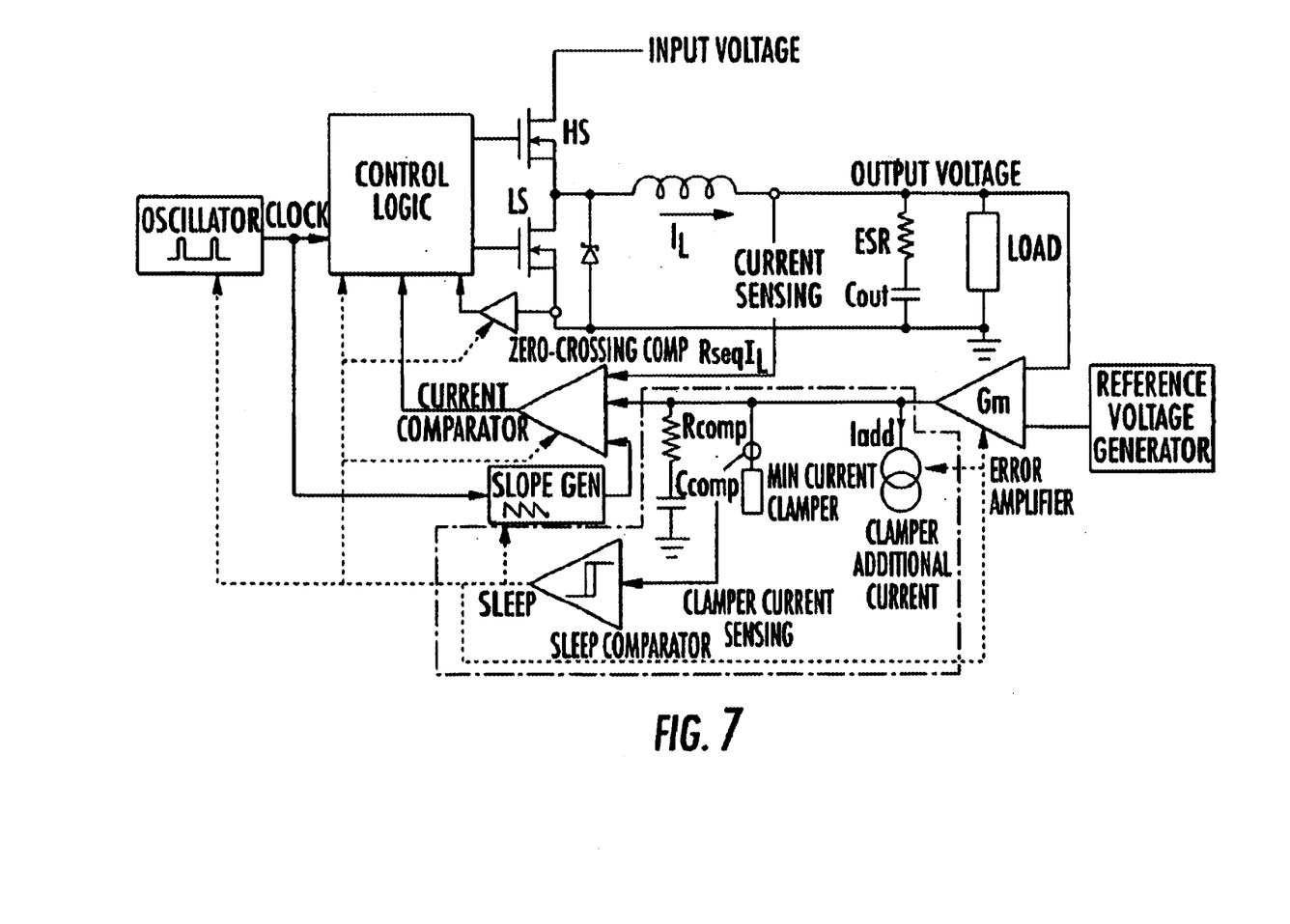
FIG. 7 is a schematic diagram depicting a voltage regulator of the present invention wherein the sleep comparator is input with a signal representative of the current flowing in a clamp.

An embodiment of the regulator of this invention is depicted in FIG. 7. A clamp that prevents the programmed current to go below the burst threshold $I_{BURST}$ is coupled to the output of the transconductance amplifier $G_M$. The stand-by signal SLEEP is generated by a hysteresis comparator of the current circulating in the clamp SLEEP COMPARATOR with thresholds $I_{MAX}$ and $I_{MIN}$. If the output capacitor has a negligible parasitic resistance ESR, the compensation resistance $R_{COMP}$ must be present. If the impedance of the clamp is smaller than the resistance $R_{COMP}$, the current in the clamp is substantially equal to the current output by the integrator (proportional to the voltage error) and the regulator of the invention behaves substantially as the regulator of FIG. 4, that is the beginning and the end of the stand-by period are tied to thresholds imposed on the output voltage $V_{OUT}$. When the parasitic series resistance ESR is relatively high, the compensation resistance $R_{COMP}$ must be omitted.

Figure 8:
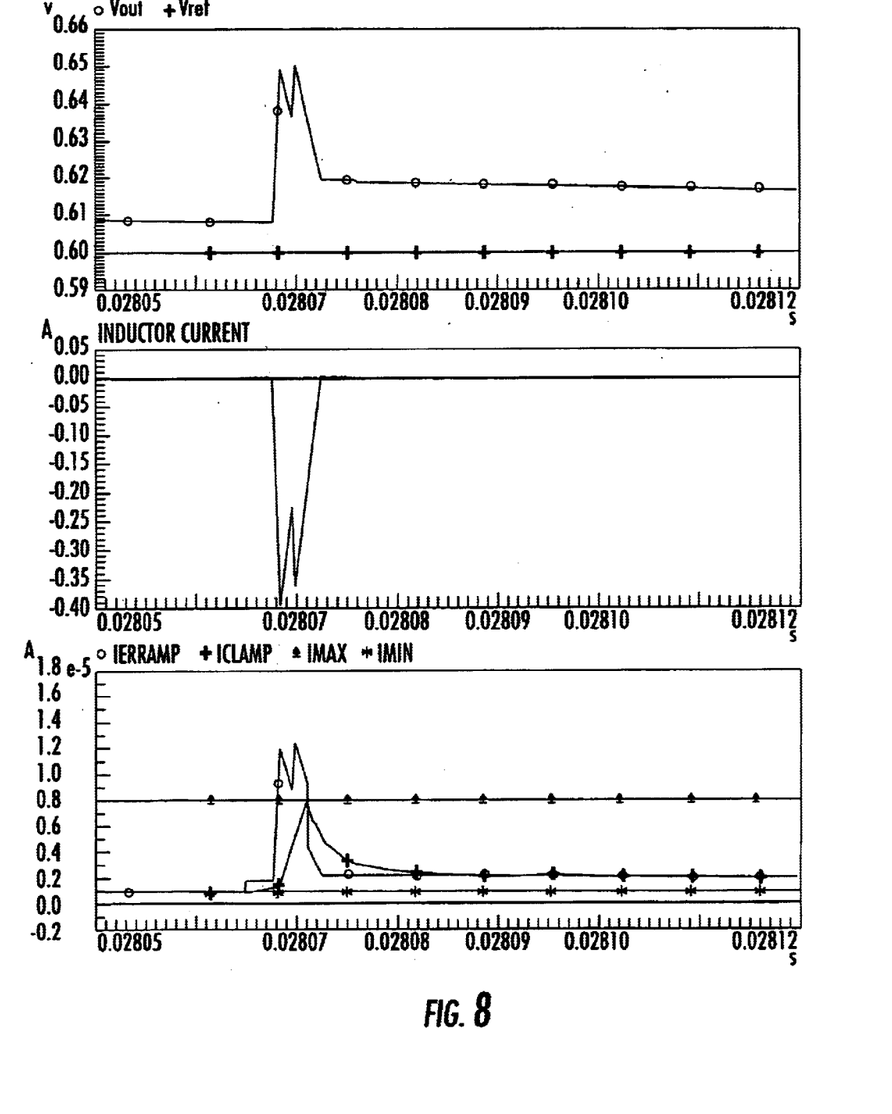
FIG. 8 is a diagram of the main signals of the regulator of FIG. 7.

As it may be observed from the diagrams of FIG. 8, obtained for $C_{OUT}$=90 μF; ESR=100 mΩ;

$I_{ADD}$=0 the current in the clamp ICLAMP tracks with a certain delay the current delivered by the transconductance amplifier IERRAMP, because of the non-null impedance of the clamp. The delay is significant in the initial phase of the burst, when the current in the inductor is increasing for attaining the value $I_{BURST}$. If the impedance of the clamp is not too low, the regulator of the invention substantially behaves as the regulator of FIG. 2, wherein only the capacitive branch is connected to the output of the integrator. The duration of the burst depends only in a negligible manner on the resistance ESR.

Vice versa, during a stand-by state, the output voltage $V_{OUT}$ decreases very slowly, thus the delay between the current in the clamp and the current of the integrator (delay which is proportional to the difference between the output voltage and the reference voltage) is negligible. As a matter of fact, the lower the load, the more negligible the lag. Under these circumstances, the operation of the regulator of the invention becomes like that of the regulator of FIG. 4.

By properly choosing the resistance of the clamp, it is possible to obtain an outstandingly satisfying operation. The response of the present regulator to a load transient is relatively fast, because the clamp prevents the integration capacitance to discharge during long stand-by intervals, contrary to what happened in the know regulator of FIG. 2. The known regulator of FIG. 4 ensures that the range of variation of output voltage remains as pre-defined, providing the advantage that for any load condition, there will be a maximum admitted over-voltage, which other known regulators of FIGS. 2 and 6 are unable to ensure because they control the beginning of the stand-by state in function of the integral of the difference between the output voltage and the reference voltage.

Vis-à-vis with this prior art, the regulator of the invention represents a significant improvement by virtue of the fact that the current circulating in the clamp tracks the output voltage beside the filtering due to the integration capacitance and to the finite impedance of the clamp. In the regulator of this invention, it is possible to reduce the consumption of the transconductance amplifier $G_M$, thus reducing the current that may be delivered during the stand-by state without worsening excessively the response speed of the regulator to load variations that may occur during the stand-by.

In the present regulator, at the beginning of the stand-by state, the current delivered by the transconductance ampli fier decreases form $I_{MAX}$ to $I_{MAX}/K$, being K>1 the reduction ratio of the delivered current, and it is ensured that $$\frac{I_{MAX}}{K} > I_{MIN} \quad (3)$$

for preventing the sleep comparator from switching again.

According to an alternative embodiment, the regulator includes a current generator $I_{ADD}$, that is turned on only during the stand-by state. In this way, the stand-by state ends when the current in the transconductance amplifier becomes equal to $I_{MIN}-I_{ADD}$. By assuming that the integration branch $C_{COMP}-R_{COMP}$ does not introduce any delay, the current in the clamp will be substantially equal to the current that is output by the transconductance amplifier. If the generator $I_{ADD}$ is not used, the output voltage $V_{OUT}$ at which the regulator resumes from the stand-by (assuming that the integration branch $C_{COMP}-R_{COMP}$ does not introduce any delay) would be greater than the reference voltage $V_{REF}$, as depicted in FIG. 8, where $I_{ADD}=0$. By contrast, if the current $I_{ADD}$ is equal to $I_{MIN}$, the sleep comparator switches when $V_{OUT}$ crosses the reference, thus improving the accuracy of the regulation. If the generator $I_{ADD}$ is used, instead of eq. 3, the following equation must be considered:

$$\frac{I_{MAX}}{K} > I_{MIN} - I_{ADD} \quad (4)$$

which is less restrictive.

Compared to the known approaches based on the use of a comparator of the output voltage for resuming from the stand-by, the regulator of this invention has an improved immunity to disturbances because the current in the clamp is a filtered replica of the current of the transconductance amplifier, that in turn is proportional to the output voltage. Frequently the "disturbances" are primarily represented by the (dampened) oscillations of the circuit formed by the inductor, the output capacitance and the parasitic capacitance of the switches HS and LS, that occur when the current in the inductor becomes null during a stand-by state and LS switches off (HS had already switched off). If these oscillations were not filtered, they would cause randomness of the duration of the stand-by interval (jitter).

Figure 9:
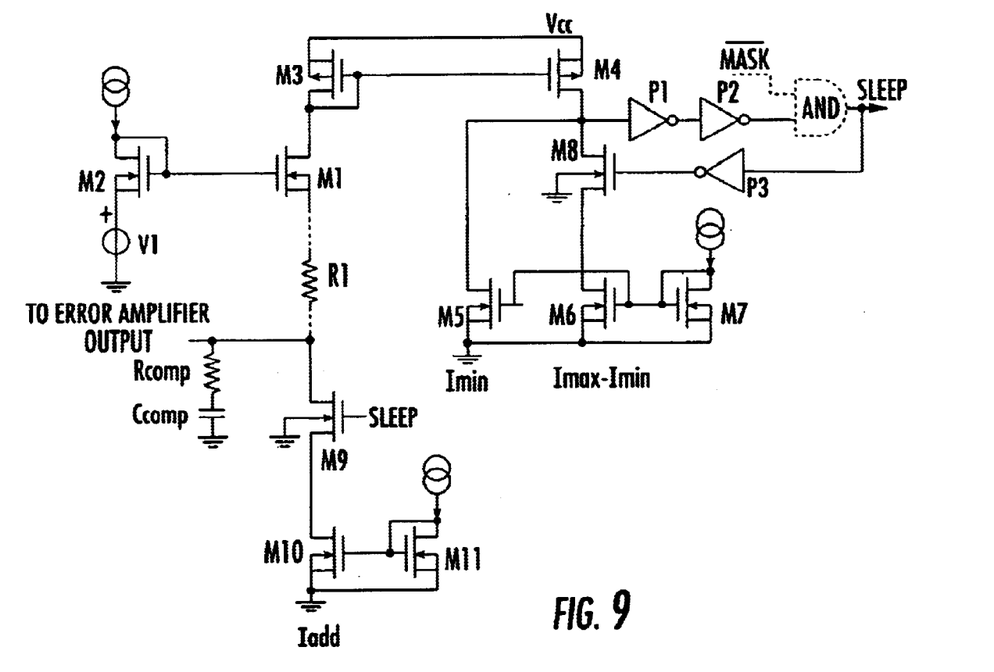
FIG. 9 is a schematic diagram depicting an embodiment of the circuit of FIG. 7, identified by a dashed line perimeter.

A possible implementation of the circuit identified by the dashed line perimeter in FIG. 7 is depicted in FIG. 9. The clamp is formed by a MOS transistor M1. A second MOS transistor M2 similar to M1 makes the threshold voltage of the clamp equal to the voltage of the generator V1, compensating the threshold voltage of M1. The current mirror composed of the MOS transistors M3 and M4 and the current generator M5 and M6 realize the comparator. The desired hysteresis is obtained with the MOS M7.

To make the system more robust against switching noise, it is possible to generate the stand-by signal SLEEP by preventively masking the output of the comparator for a certain time after each switching, by using the shown AND gate. The gate of M7 is driven by the inverted replica of the stand-by signal SLEEP. The masking ensures that the output of the comparator be ignored for a short time after each turning on or off of a power switch (HS or LS) to prevent the noise generated by the switching from being interpreted as due to the switching on of the clamp. The masking time must ensure the masking of the decay time of switching disturbances that is typically of the order of few hundreds of nanoseconds. The MOS transistors M9, M10, M11 implement the optional current generator controlled by the stand-by signal SLEEP, according to the latter embodiment described above.

Figure 10:
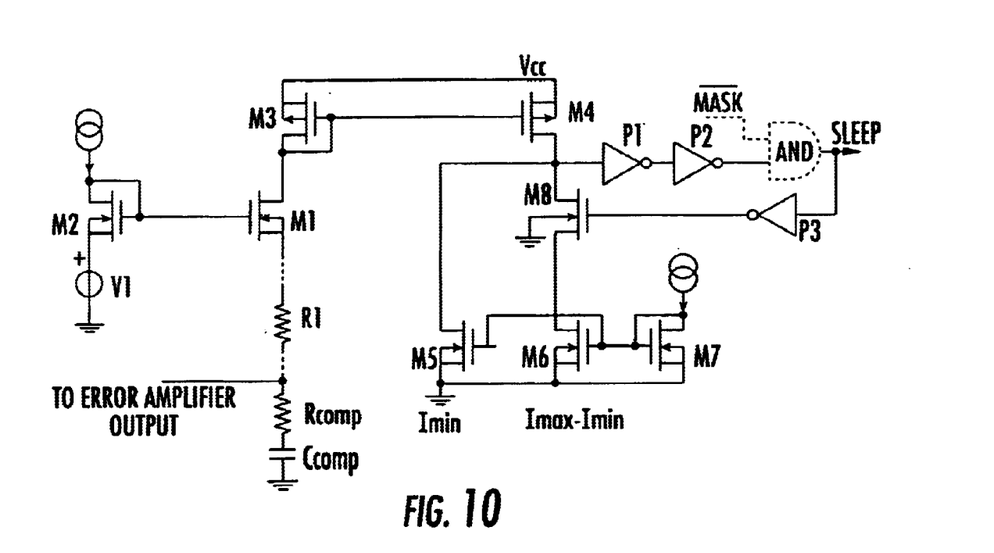
FIG. 10 is a schematic diagram depicting a preferred embodiment of the circuit of FIG. 7, identified by a dashed line perimeter without the optional current generator.

FIG. 10, like FIG. 9, depicts a preferred embodiment of the circuit identified by the dashed line perimeter in FIG. 7. Differently from the circuit of FIG. 9, the optional current generator $I_{ADD}$ is not present. Possibly a resistor R1 may be introduced in series to the clamp, to increase the duration of the burst but in so doing reducing the speed of the response of the regulator if the integration branch contains substantially only a capacitance $C_{COMP}$.

A possible choice of the parameters will now be indicated. The upper current threshold $I_{MAX}$ may correspond to the current delivered by the transconductance amplifier when the output voltage is about 4% higher than the reference voltage. The bias current of the transconductance amplifier may be halved (K=2) during stand-by. Therefore, the lower threshold current $I_{MIN}$ in the clamp should be smaller than half the maximum current $I_{MAX}$, for instance one eighth.

The output voltage swing of the transconductance amplifier is about $$\eta V_t \log\left(\frac{I_{MAX}}{I_{MIN}}\right)$$

wherein $V_t$ is the thermal voltage (25 mV at room temperature), $\eta$ the ideality factor of the MOS transistor by supposing to be functioning below threshold. Being $\eta$ greater than one, there will be a swing of at least 52 mV, being $I_{MAX}/I_{MIN}=8$.

That which is claimed is:

1. A regulator of the supply voltage for a load comprising:
   a supply node at an unregulated voltage;
   a ground node;
   an output node providing an output voltage;
   a power stage, connected between the supply node and the ground node, and including at least one power switch;
   an inductor driven by the power stage, and connected by the power switch to the supply node;
   an output capacitor connected between the output node and the ground node and having a parasitic series resistance;
   a first comparator with hysteresis producing a stand-by signal when the output voltage exceeds a reference voltage;
   an integrator, the power consumption of which may be reduced by the stand-by signal, including a capacitive integration branch, and generating a feedback signal representing a programmed output current;
   a clamp connected in parallel to the capacitive integration branch for making the feedback signal greater than a minimum threshold corresponding to a minimum programmed output current;
   a first current sensing circuit to generate a first signal proportional to current in the inductor;
   a second comparator disabled by the stand-by signal, receiving the feedback signal and the first signal, and producing a logic comparison signal;
   a controller to control the at least one power switch of the power stage, receiving the logic comparison signal and the stand-by signal; and
   a second current sensing circuit to sense current in the clamp and generate a second signal representative of the sensed current;
   the first comparator receiving the second signal to enable the stand-by signal when the current in the clamp exceeds an upper threshold and disable the stand-by signal when the current in the clamp drops below a lower threshold.

2. The regulator of claim 1, wherein the second current sensing circuit comprises a first current mirror biased by the current in the clamp.

3. The regulator of claim 1, wherein the integrator further comprises a transconductance error amplifier receiving the regulated supply voltage and the reference voltage, and wherein the capacitive integration branch is connected between an output of the transconductance error amplifier and the ground node.

4. The regulator of claim 3, further comprising a current generator, enabled by the stand-by signal, for absorbing current from the output of the transconductance error amplifier.

5. The regulator of claim 4, wherein the current generator comprises a second current mirror coupled to the output terminal of the transconductance error amplifier through a switch, switched on by the stand-by signal.

6. The regulator of claim 3, wherein the upper threshold corresponds to the current output by the transconductance amplifier when the output voltage exceeds the reference voltage by 4%, and the lower threshold is about one eighth of the upper threshold.

7. The regulator of claim 1, wherein the capacitive integration branch comprises an integration capacitor connected in series with a compensation resistance.

8. The regulator of claim 1, further comprising a logic circuit connected to the output of the first comparator and controlled by the controller, for masking the output based upon switching of the at least one power switch of the power stage.

9. The regulator of claim 1, wherein the second current sensing circuit comprises a first current mirror biased by the current in the clamp and comprising a first diode-connected transistor and a second transistor having a common current terminal; wherein the clamp comprises a first transistor connected in a source follower configuration with a second diode-connected transistor and biased with a voltage and a pre-established current; the first comparator comprises three transistors in parallel defining third and fourth current mirrors, both having a current terminal connected to ground and the other terminal respectively connected directly and through a switch, turned off by the stand-by signal, to an output of the first comparator; the common current terminal of the transistors of the first current mirror being connected to a power supply line, the first diode-connected transistor being in series with the clamp and the second transistor being connected to the output node of the first comparator.

10. The regulator of claim 9, wherein the clamp further comprises a resistance in series with the first transistor.

11. A voltage regulator comprising:
a power stage including at least one power switch;
an inductor driven by the power stage;
an output capacitor connected to the inductor;
a first comparator to generate a stand-by signal when an output voltage exceeds a reference voltage;
an integrator generating a feedback signal representing a programmed output current;
a clamp connected to the integrator to control the feedback signal based upon a minimum programmed output current;
a first current sensing circuit to generate a first signal proportional to current in the inductor;
a second comparator receiving the feedback signal and the first signal, and producing a comparison signal;
a controller to control the at least one power switch of the power stage, receiving the logic comparison signal and the stand-by signal; and
a second current sensing circuit connected to the clamp and providing a second signal to the first comparator to control the stand-by signal based upon current in the clamp.

12. The voltage regulator of claim 11, wherein the second current sensing circuit comprises a first current mirror biased by the current in the clamp.

13. The voltage regulator of claim 11, wherein the integrator further comprises:
a transconductance error amplifier receiving a regulated supply voltage and a reference voltage; and
a capacitive integration branch connected between an output of the transconductance error amplifier and ground.

14. The voltage regulator of claim 13, wherein the capacitive integration branch comprises an integration capacitor connected in series with a compensation resistance.

15. The voltage regulator of claim 13, further comprising a current generator, enabled by the stand-by signal, for absorbing current from the output of the transconductance error amplifier.

16. The voltage regulator of claim 15, wherein the current generator comprises a second current mirror coupled to the output terminal of the transconductance error amplifier through a switch, switched on by the stand-by signal.

17. The voltage regulator of claim 11, further comprising a logic circuit connected to the output of the first comparator and controlled by the controller, for masking the output based upon switching of the at least one power switch of the power stage.

18. The voltage regulator of claim 11, wherein the second current sensing circuit comprises a first current mirror biased by the current in the clamp and comprising a first diode-connected transistor and a second transistor having a common current terminal; wherein the clamp comprises a first transistor connected in a source follower configuration with a second diode-connected transistor and biased with a voltage and a pre-established current; the first comparator comprises three transistors in parallel defining third and fourth current mirrors, both having a current terminal connected to ground and the other terminal respectively connected directly and through a switch, turned off by the stand-by signal, to an output of the first comparator; the common current terminal of the transistors of the first current mirror being connected to a power supply line, the first diode-connected transistor being in series with the clamp and the second transistor being connected to the output node of the first comparator.

19. The voltage regulator of claim 18, wherein the clamp further comprises a resistance in series with the first transistor.

20. A method of regulating voltage comprising:
providing a power stage including at least one power switch to drive an inductor;
generating a stand-by signal, with a first comparator, based upon a comparison between an output voltage and a reference voltage;
generating a feedback signal, with an integrator, representing a programmed output current;
controlling the feedback signal with a clamp connected to the integrator and based upon a minimum programmed output current;
generating a first signal proportional to current in the inductor with a first current sensing circuit;

producing a comparison signal, with a second comparator, based upon the feedback signal and the first signal;

controlling the at least one power switch of the power stage, with a controller, based upon the comparison signal and the stand-by signal; and controlling the first comparator with a second current sensing circuit connected to the clamp.

21. The method of claim 20, wherein the second current sensing circuit comprises a first current mirror biased by the current in the clamp.

22. The method of claim 20, wherein the integrator further comprises:

a transconductance error amplifier receiving a regulated supply voltage and a reference voltage; and a capacitive integration branch connected between an output of the transconductance error amplifier and ground.

23. The method of claim 22, wherein the capacitive integration branch comprises an integration capacitor connected in series with a compensation resistance.

24. The method of claim 22, further comprising a current generator, enabled by the stand-by signal, for absorbing current from the output of the transconductance error amplifier.

25. The method of claim 20, further comprising masking the output voltage based upon switching of the at least one power switch of the power stage with a logic circuit connected to the output of the first comparator and controlled by the controller.

26. The method of claim 20, wherein the second current sensing circuit comprises a first current mirror biased by the current in the clamp and comprising a first diode-connected transistor and a second transistor having a common current terminal; wherein the clamp comprises a first transistor connected in a source follower configuration with a second diode-connected transistor and biased with a voltage and a pre-established current; the first comparator comprises three transistors in parallel defining third and fourth current mirrors, both having a current terminal connected to ground and the other terminal respectively connected directly and through a switch, turned off by the stand-by signal, to an output of the first comparator; the common current terminal of the transistors of the first current mirror being connected to a power supply line, the first diode-connected transistor being in series with the clamp and the second transistor being connected to the output node of the first comparator.

27. The method of claim 26, wherein the current generator comprises a second current mirror coupled to the output terminal of the transconductance error amplifier through a switch, switched on by the stand-by signal.

28. The voltage regulator of claim 26, wherein the clamp further comprises a resistance in series with the first transistor.

\* \* \* \* \*